United States Patent Office 3,341,573
Patented Sept. 12, 1967

3,341,573
POLYAMIDE ESTERS FOR HYDRAULIC FLUIDS AND METHOD OF MAKING THE SAME
William J. Shibe, Jr., Riverton, N.J., assignor to R. M. Hollingshead Corporation, Camden, N.J., a corporation of New Jersey
No Drawing. Filed June 5, 1963, Ser. No. 285,585
4 Claims. (Cl. 260—482)

This invention relates to hydraulic fluid compositions and to methods of making the same. More particularly, this invention relates to polyamide esters prepared from polyglycol amines and dicarboxylic organic acids.

In the preparation of hydraulic fluids it is necessary to provide products having suitable viscosity characteristics, flash point and acid number, and which are nevertheless compatible with salt water such as sea water for example. In many of the existing hydraulic fluids which are otherwise entirely satisfactory, they have been found incompatible with sea water and even as little as 10% by weight of sea water has caused gumming of the product. It is an object of this invention to overcome this disadvantage.

Still another object of this invention is to provide a hydraulic fluid which is usable alone, with no water, or which can be diluted with water as well. A further object is to provide a hydraulic fluid of this type which is flame-resistant.

Some hydraulic fluids which are presently in use have exhibited the highly unfortunate characteristic of undergoing combustion under pressure. On more than one occasion, this property has resulted in serious explosions and fires on naval and other vessels.

The foregoing and other objects are accomplished in accordance with this invention by providing a combination of steps which comprises contacting and reacting approximately equi-molar portions of ingredients (1) and (2), wherein ingredient (1) is a polyglycol amine having a formula selected from the group consisting of $NH_2(CH_2CH_2O)_mH$ where $m$ is an integer from 2 to 45 and $NH_2[(CH_2CH(CH_3)O]_mH$ where $m$ is an integer from 2 to 45, and ingredient (2) is a dibasic acid selected from the group consisting of acids of the formula $$HOOC(CH_2)_nCOOH$$

where $n$ is an integer from 1 to 10, phthalic, isophthalic, pyromellitic and bicyclo (2,2,1) heptane 5-dicarboxylic acids, and the anhydrides of all said acids, and products produced by such methods.

These products are all soluble in water and as will become apparent hereinafter, many are suitable for use as hydraulic fluids entirely independently of the presence of water.

The polyglycolamines comprising starting materials according to this invention include diglycolamine which is $NH_2CH_2CH_2OCH_2CH_2OH$. Higher molecular weight polymers, up to about 45 moles of glycol per mole of amine, are suitable. Examples are:

"Polyglycolamine E 500" which is $NH_2(CH_2CH_2O)_{11}H$
"Polyglycolamine E 1000" which is $NH_2(CH_2CH_2O)_{28}H$
"Polyglycolamine P 515" which is
   $NH_2[CH_2CH(CH_3)O]_9H$
"Polyglycolamine P 1000" which is
   $NH_2[CH_2CH(CH_3)O]_{17}H$ The organic acids which are suitable in accordance with this invention include succinic, adipic, azelaic, sebacic, dodecyl succinic, and all other aliphatic dibasic acids of the formula $HOOC(CH_2)_nCOOH$ where $n$ is an integer from 1 to 10, as well as phthalic, isophthalic, pyromellitic and bicyclo (2,2,1) heptane 5-dicarboxylic acids and the corresponding acid anhydrides of all such acids, including bicyclo (2,2,1) heptane 5-dicarboxylic acid 2,3-anhydride.

According to this invention, the polyglycol as indicated in the following typical amine reacts with the acid as indicated in the following typical reaction.

The reaction takes place in two steps. First step—formation of amide:

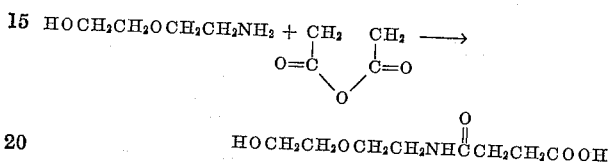

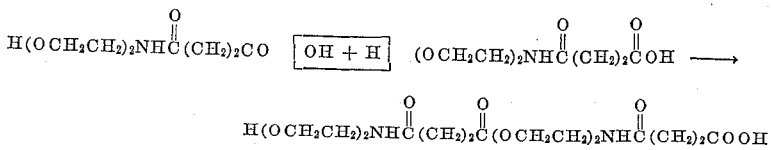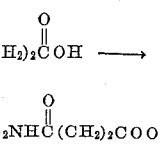

The second step is a formation of a polyester with the elimination of water:

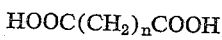

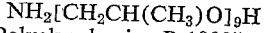
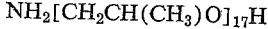

Example 1

A typical example of preparation of polyamide esters in accordance with this invention is as follows:

Equipment—3-neck round bottom flask (500 ml.) with agitator, thermometer, and Dean-Stark tube to collect water.

Place 50.25 grams of diglycol amine, 50 grams of succinic anhydride, and 150 ml. of xylene in glass. Reflux with agitation, 6 hours. 9 ml. of water collected, 12 hours reflux produces 9.5 ml. of water. Remove xylene under reduced pressure.

The product had the following physical properties:

| | | |
|---|---|---|
| Viscosity at 100° F. | centipoises | 186 |
| Viscosity at 210° F. | do | 11.77 |
| Pour point | ° F. | +5 |
| Acid number | | 20.7 |
| Viscosity index | | 29 |
| Flash point (COC) | ° F. | 430 |
| 4-ball result | | 0.0271 |

Example 2

A polyamide ester was prepared by reacting $$NH_2(CH_2CH_2O)_{11}H$$

(100 grams) with 20.4 grams succinic anhydride, refluxed for 7 hours, with collection of 4.5 ml. water, and was found to have the following physical properties:

| | | |
|---|---|---|
| Viscosity at 100° F. | centipoises | 464 |
| Viscosity at 210° F. | do | 36 |
| Viscosity index | | 115 |
| Flash point | ° F. | 580 |
| State | | Liquid |
| Acid number | | 40.2 |
| 4-ball result | | .0236 |

Example 3

A polyamide ester was prepared from 100 grams $$NH_2(CH_2CH_2O)_{28}H$$

and 20.4 grams succinic anhydride, refluxed 7 hours with recovery of 2.3 ml. water, and was found to have the following physical properties:

| | |
|---|---|
| Viscosity at 100° F. _____centipoises__ | 212.76 |
| Viscosity at 210° F. _____do____ | 41.4 |
| Viscosity index _____ | 125 |
| Flash point _____° F__ | 550 |
| State _____ | Solid |
| 4-ball result _____ | .0285 |
| Acid number _____ | 5.5 |

Example 4

$$NH_2[CH_2CH(CH_3)O]_9H$$

which was reacted with succinic anhydride and the product had the following physical properties:

| | |
|---|---|
| Viscosity at 100° F. _____ | 212 |
| Viscosity at 210° F. _____ | 19.7 |
| Viscosity index _____ | 78.5 |
| Flash point _____° F__ | 490 |
| State _____ | Liquid |

A polyamide ester was prepared from

A polyamide ester was prepared from

Example 5

$$NH_2(CH_2CH_2O)_{11}H$$

(100 grams) which was reacted with adipic acid (29.2 grams), refluxed 7 hours with recovery of 4.0 ml. water, and the product had the following physical properties:

| | |
|---|---|
| Viscosity at 100° F. _____centipoises__ | 790.4 |
| Viscosity at 210° F. _____do____ | 57.9 |
| Viscosity index _____ | 118 |
| Acid number _____ | 64.5 |
| 4-ball result _____ | .0233 |
| Flash point (COC)_____° F__ | 635 |
| Pour point _____° F__ | +35 |

Example 6

A polyamide ester was prepared from $$NH_2[CH_2CH(CH_3)O]_9H$$

(82 grams) which was reacted with adipic acid (23.9 grams), refluxed 7 hours with recovery of 2.4 ml. water, and the product had the following physical properties:

| | |
|---|---|
| Viscosity at 100° F. _____ | 517 |
| Viscosity at 210° F. _____ | 32 |
| Viscosity index _____ | 88 |
| Flash point (COC)_____ | 535 |
| 4-ball result _____ | .0288 |

Example 7

The polyglycol amine ester obtained in accordance with Example 3 (by reaction with succinic anhydride) was mixed with water in varying quantities and the following results were obtained:

| Percent Polymer by weight | Percent Water by weight | Viscosity at 100° F. | Viscosity at 210° F. | Viscosity Index |
|---|---|---|---|---|
| 100 | 0 | 417 | 41.5 | 125 |
| 75 | 25 | 85 | 12.5 | 133 |
| 50 | 50 | 15.18 | 3.73 | over 150 |

Example 8

A series of shell four ball tests was run for two hours, at 50 kg. load at ambient temperatures, testing for scar size in connection with various polymers made in accordance with this invention. The following results were obtained:

| Polymer: | Scar size in inches |
|---|---|
| Diglycolamine+succinic anhydride | .0271 |
| Diglycolamine+phthalic anhydride | .0334 |
| Diglycolamine+carbic anhydride | .0274 |
| $NH_2(CH_2CH_2O)_{11}H$+succinic anhydride | .0217 |
| $NH_2(CH_2CH_2O)_{28}H$+succinic anhydride | .0285 |
| $NH_2[CH_2CH(CH_3)O]_9H$+succinic anhydride | .0310 |

The polymers from succinic anhydride and $$NH_2(CH_2CH_2O)_{11}H$$

were found to be compatible when mixed with 50% by weight of a 10% by weight sodium chloride solution and also compatible with 50% by weight of a solution of synthetic sea water.

Example 9

A polyamide ester was prepared by mixing 1.1 mole of diglycolamine with 1 mole of succinic anhydride. This product had a viscosity index of 1, a viscosity at 100° F. of 345.8 centipoises, a viscosity at 210° F. of 15.44 centipoises, a flash point of 435° F., an acid number of 31.59, and a four ball test scar of .0273 inch. The product was found to have excellent qualities as a hydraulic fluid.

The polyamide esters produced according to this invention have special advantage in that they are compatible with salt water such as sea water for example, and also possess outstanding characteristics as to viscosity, flash point and acid number.

Although this invention has been described with reference to specific forms thereof, it will be appreciated that variations may be made in the specific components of the compositions and that equivalent elements may be substituted for those specifically described in the examples. All such changes including the substitution of equivalent compounds for those specifically disclosed, are intended to fall within the scope of the invention as defined by the appended claims.

It is claimed:

1. A polyamide ester prepared by the process of contacting and reacting approximately equi-molar portions of ingredients (1) and (2), wherein ingredient (1) is a polyglycol amine having a formula selected from the group consisting of $NH_2(CH_2CH_2O)_mH$ where $m$ is an integer from 2 to 45 and $NH_2[(CH_2CH(CH_3)O]_mH$ where $m$ is an integer from 2 to 45, and ingredient (2) is a dibasic acid selected from the group consisting of acids of the formula $HOOC(CH_2)_nCOOH$ where $n$ is an integer from 1 to 10, phthalic, isophthalic, pyromellitic and bicyclo (2,2,1) heptane 5-dicarboxylic acids, and the anhydrides of all said acids.

2. A polyamide ester consisting essentially of the product of reaction of approximately equi-molar portions of (a) polyglycol amine selected from the group consisting of diglycol amine $$NH_2(CH_2CH_2O)_{11}H, NH_2(CH_2CH_2O)_{28}H$$
$$NH_2[CH_2CH(CH_3)O]_9H, NH_2[CH_2CH(CH_3O)]_{17}H$$

and (b) an organic acid of the formula $$HOOC(CH_2)_nCOOH$$

where $n$ is an integer from 1 to 10, and the corresponding acid anhydrides.

3. A polyamide ester consisting essentially of the product of reaction of approximately equi-molar portions of diglycol amine and succinic acid.

4. In a method of making a hydraulic fluid, the steps which comprise contacting and reacting approximately equi-molar portions of (a) polyglycol amine selected from the group consisting of diglycol amine, $$NH_2(CH_2CH_2O)_{11}H, \ NH_2(CH_2CH_2O)_{28}H$$
$$NH_2[CH_2CH(CH_3)O]_9H, \ NH_2[CH_2CH(CH_3)O]_{17}H$$

and (b) an organic acid of the formula $$HOOC(CH_2)_nCOOH$$

where n is an integer from 1 to 10, and the corresponding acid anhydrides.

References Cited

UNITED STATES PATENTS

| | | | |
|---|---|---|---|
| 3,005,776 | 10/1961 | Langer | 252—77 |
| 3,061,547 | 10/1962 | Brandner | 252—77 |
| 3,172,853 | 3/1965 | Stromberg | 252—51.5 |
| 3,251,776 | 5/1966 | Gee | 252—77 |

LORRAINE A. WEINBERGER, *Primary Examiner.*

A. P. HALLIUN, *Assistant Examiner.*